(12) United States Patent
Kubo et al.

(10) Patent No.: US 6,680,751 B1
(45) Date of Patent: Jan. 20, 2004

(54) TIMING PULSE GENERATING APPARATUS

(75) Inventors: Naoki Kubo, Asaka (JP); Hiroshi Tamayama, Asaka (JP); Takashi Yano, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/533,988

(22) Filed: Mar. 24, 2000

(30) Foreign Application Priority Data

Mar. 26, 1999 (JP) .......................................... 11-083514

(51) Int. Cl.[7] .............................................. H04N 5/335
(52) U.S. Cl. ........................ 348/312; 348/294; 348/296
(58) Field of Search ................................ 348/294, 295, 348/296, 297, 298, 311, 312, 302, 303, 220.1; 250/208.1

(56) References Cited

U.S. PATENT DOCUMENTS

| | | | |
|---|---|---|---|
| 5,982,428 A | * 11/1999 | Charneski et al. | .......... 348/312 |
| 6,035,137 A | 3/2000 | Kaneko et al. | |
| 6,417,882 B1 | * 7/2002 | Mahant-Shetti | ............. 348/302 |
| 2001/0050713 A1 | * 12/2001 | Kubo et al. | ................. 348/220 |

FOREIGN PATENT DOCUMENTS

JP          09205591 A      8/1997

* cited by examiner

*Primary Examiner*—Tuan Ho
(74) *Attorney, Agent, or Firm*—Birch, Stewart, Kolasch & Birch, LLP

(57) ABSTRACT

A timing pulse generating apparatus generates a variety of timing pulses used for acquiring image signals from a solid-state imaging device. A horizontal-ROM stores pattern data representing timing pulses for one period first generated in a horizontal scanning period and repeat times of the timing pulses for one period in the horizontal scanning period. Appropriate pattern data is read from the horizontal-ROM and set in a horizontal-register. A timing pulse generating circuit generates timing pulses in accordance with a count value of a horizontal-counter and the pattern data set in the horizontal-register. Thus, the amount of the pattern data is small even if the repeat times of the timing pulses for one period in the horizontal scanning period are large.

13 Claims, 4 Drawing Sheets

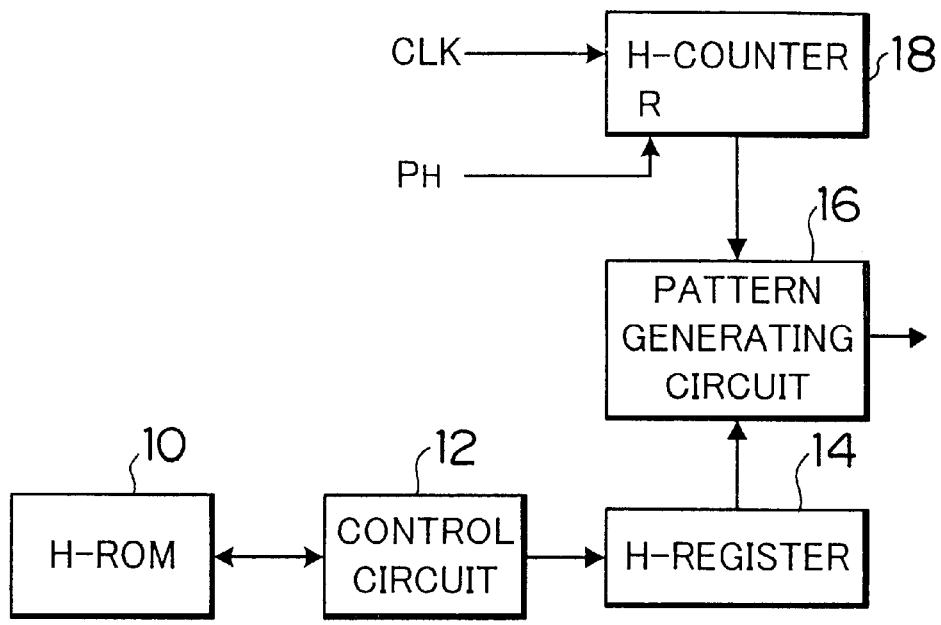
F I G. 1
F I G. 2
BASIC PATTERN a
|  | START LEVEL | FIRST CHANGE POINT | SECOND CHANGE POINT | PATTERN LENGTH |
|---|---|---|---|---|
| V1 | "1" | 5 | 25 | |
| V2 | "0" | 10 | 30 | 40 |
| V3 | "1" | 15 | 35 | |

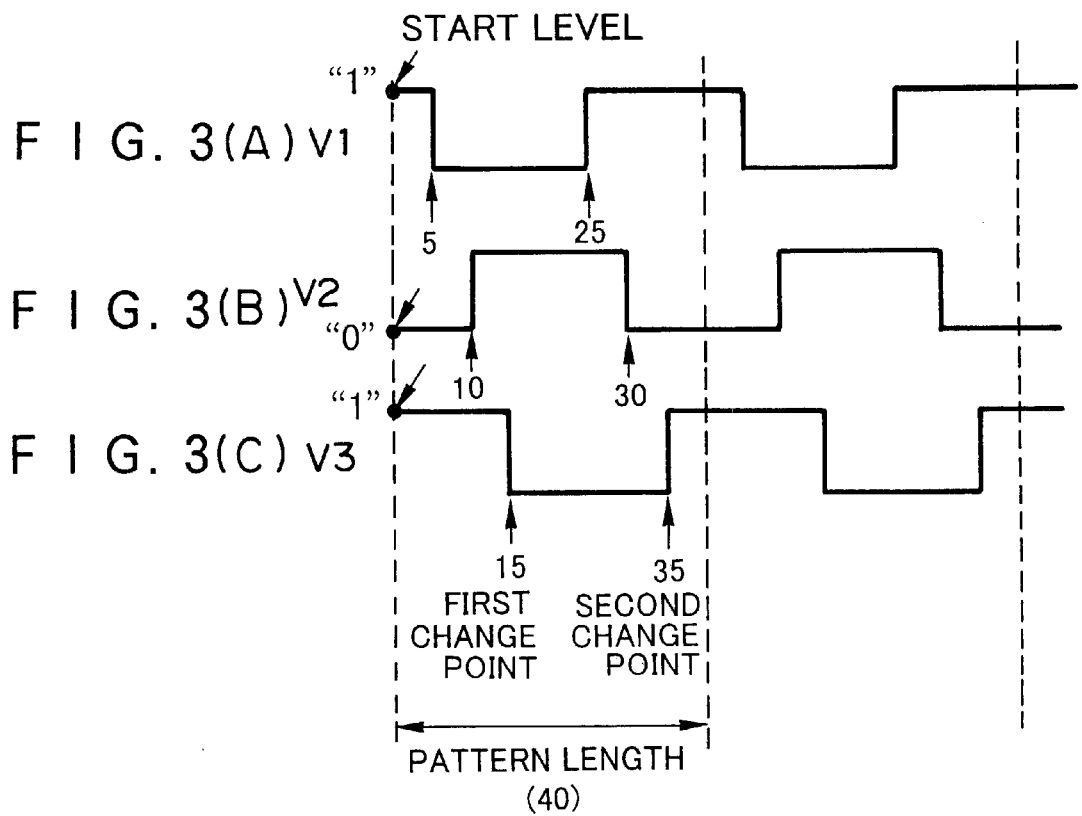

TIMING PULSE GENERATING APPARATUS

BACKGROUND OF THE INVENTION

1. Field of the Invention

The present invention generally relates to a timing pulse generating apparatus, and more particularly to a timing pulse generating apparatus for generating a variety of timing pulses used for acquiring image signals from a solid-state imaging device.

2. Description of Related Art

A conventional timing pulse generating apparatus comprises a counter that produces address data by counting reference clocks in one frame period and a read only memory (a ROM) that stores data (signal level is "1" or "0") for generating timing pulses for one frame period. To generate the timing pulses, the timing pulse generating apparatus successively reads data whose signal level is "1" or "0" from the ROM in accordance with the address data produced by the counter.

To generate one timing pulse on one screen of a solid-state imaging device whose horizontal number of pixels is 780 and vertical number of pixels is 520, the ROM requires a capacity of 50 kilobyte, which is arrived at by multiplying 780 by 525 and dividing the product by 8. A plurality of timing pulses is required to drive the solid-state imaging device, and the solid-state imaging device has a plurality of drive modes such as a drive mode for normal shooting, a drive mode for animations and a drive mode for auto focusing. Therefore, the ROM requires a capacity of at least 1 megabyte, which is arrived at by multiplying 50 kilobyte by the number of the types of the pulses and multiplying the product by the number of the modes, and the capacity of the ROM must be large as a result.

Japanese Patent Provisional Publication No. 9-205591 discloses a timing pulse generating circuit that reduces the capacity of the ROM. The timing pulse generating circuit stores in the ROM only data representing change points of the timing pulses and periods when the data is kept, and controls reading the data from the ROM to generate the timing pulses. In the case of this timing pulse generating circuit, however, the more change points the timing pulses have, the more data the ROM has to store, and the data stored in the ROM is required for the number of the modes. Moreover, horizontal timing pulses are not always the same at all the vertical lines, and thus it is required to generate a plurality of timing pulses and select only desired timing pulses in accordance with the positions of the lines. Therefore, the timing pulse generating circuit is complicated.

SUMMARY OF THE INVENTION

The present invention has been developed in view of the above-described circumstances, and has as its object the provision of a timing pulse generating apparatus that can remarkably reduce the amount of data used for generating timing pulses and can reduce the cost of a storing device for storing the data.

To achieve the above-described object, the present invention is directed to a timing pulse generating apparatus which generates a variety of timing pulses used for acquiring image signals from a solid-state imaging device, the timing pulse generating apparatus comprising: a horizontal counter which counts reference clocks, a count value of the horizontal counter being reset in synchronization with a horizontal synchronous signal; a storing device which stores pattern data for generating the timing pulses, the pattern data comprising data representing timing pulses for one period first generated in a horizontal scanning period and repeat times of the timing pulses for one period in the horizontal scanning period; a pattern data setting device which reads the pattern data corresponding to desired timing pulses from the storing device and sets the read pattern data in a horizontal register; and a timing pulse generating device which generates and outputs the timing pulses in accordance with the count value of the horizontal counter and the pattern data set in the horizontal register.

According to the present invention, the timing pulses are generated in accordance with the pattern data representing the timing pulses for one period first generated in the horizontal scanning period and the repeat times of the timing pulses for one period in the horizontal scanning period. Therefore, the amount of the pattern data is small even if the repeat times of the timing pulses for one period in the horizontal scanning period are large.

To achieve the above-described object, the present invention is directed to a timing pulse generating apparatus which generates a variety of timing pulses used for acquiring image signals from a solid-state imaging device in accordance with pattern data representing timing pulses set in a horizontal register, the timing pulse generating apparatus comprising: a vertical counter which counts clocks synchronous with a horizontal synchronous signal, a count value of the vertical counter being reset in synchronization with a vertical synchronous signal; a first storing device which stores a plurality of pieces of pattern data for generating a plurality of types of timing pulses; a second storing device which stores mode data in accordance with a plurality of drive modes of the solid-state imaging device, the mode data representing names of patterns in the pattern data arranged in a predetermined order in one of one field and one frame to output at least one type of timing pulses and vertical switch positions where the timing pulses corresponding to the names of the patterns are switched; a mode data setting device which reads the mode data from the second storing device in accordance with the drive mode of the solid-state imaging device and sets the read mode data in a vertical register; and a pattern data setting device which reads the pattern data from the first storing device in accordance with the count value of the vertical counter and the mode data set in the vertical register and sets the pattern data in the horizontal register.

According to the present invention, the mode data is read from the second storing device in accordance with the drive mode of the solid-state imaging device and set in the vertical register. The mode data comprises the data representing the names of the patterns in the pattern data arranged to output one or more types of the timing pulses in the predetermined order in one field or frame and the vertical switch positions where the patterns are switched.

Thus, the timing pulses are switched at appropriate vertical positions in accordance with the mode data set in the vertical register, and the amount of the data can be small since the pattern data stored in the first storing device are commonly used even if there are a lot of modes.

To achieve the above-described object, the present invention is directed to a timing pulse generating apparatus which generates a variety of timing pulses used for acquiring image signals from a solid-state imaging device, the timing pulse generating apparatus comprising: a horizontal counter which counts reference clocks, a count value of the horizontal counter being reset in synchronization with a horizontal synchronous signal; a first storing device which stores pattern data for generating the timing pulses, the pattern data comprising data representing timing pulses for one period first generated in a horizontal scanning period and repeat times of the timing pulses for one period in the horizontal scanning period; a vertical counter which counts clocks synchronous with a horizontal synchronous signal, a count value of the vertical counter being reset in synchronization with a vertical synchronous signal; a second storing device which stores mode data in accordance with a plurality of drive modes of the solid-state imaging device, the mode data representing names of patterns in the pattern data arranged in a predetermined order in one of one field and one frame to output at least one type of timing pulses and vertical switch positions where the timing pulses corresponding to the names of the patterns are switched; a mode data setting device which reads the mode data from the second storing device in accordance with the drive mode of the solid-state imaging device and sets the read mode data in a vertical register; a pattern data setting device which reads the pattern data from the first storing device in accordance with the count value of the vertical counter and the mode data set in the vertical register and sets the pattern data in the horizontal register; and a timing pulse generating device which generates and outputs the timing pulses in accordance with the count value of the horizontal counter and the pattern data set in the horizontal register.

Preferably, the data representing the timing pulses for one period first generated in the horizontal scanning period comprise data representing a start level at a start of the horizontal scanning period, a position of a first change point where a signal level first changes from the start level, a position of a second change point where the signal level returns to the start level after passing the first change points, and a pattern length which is a length of one period of the timing pulses. This reduces the amount of the pattern data.

Preferably, the timing pulse generating device generates the timing pulses for one period by setting a signal level to the start level at the start of the horizontal scanning period, then reversing the signal level from the start level when the count value of the horizontal counter reaches the first change point represented with the pattern data, then setting the signal level to the start level when the count value of the horizontal counter reaches the second change point represented with the pattern data, and then maintaining the signal level until the count value of the horizontal counter reaches the pattern length, and the timing pulse generating device generates the timing pulses for one period the repeat times represented with the pattern data.

Preferably, the pattern data setting device sets, at the start of one vertical scanning, the pattern data corresponding to a name of a first pattern in the mode data set in the vertical register, and performs, in the order of the names of the patterns in the mode data, setting the pattern data corresponding to the name of the next pattern in the mode data set in the vertical register when the count value of the vertical counter reaches the next vertical switch position.

Preferably, the mode data setting device comprises: a mode name setting device which sets a name of a mode in a mode register in accordance with a drive mode of the solid-state imaging device at each vertical synchronous period; and a mode data reading device which reads the mode data from the second storing device in accordance with the name of the mode set in the mode register.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 1 is a block diagram showing the structure of a timing pulse generating apparatus according to the embodiment of the present invention;

FIG. 2 is a table showing a basic pattern that composes pattern data stored in an H-ROM shown in FIG. 1;

FIGS. 3(A), 3(B) and 3(C) are waveform diagrams showing timing pulses in accordance with the basic pattern shown in FIG. 2;

FIG. 4 is a table showing the pattern data stored in the H-ROM shown in FIG. 1;

DETAILED DESCRIPTION OF THE PREFERRED EMBODIMENT

Figures 5, 6:
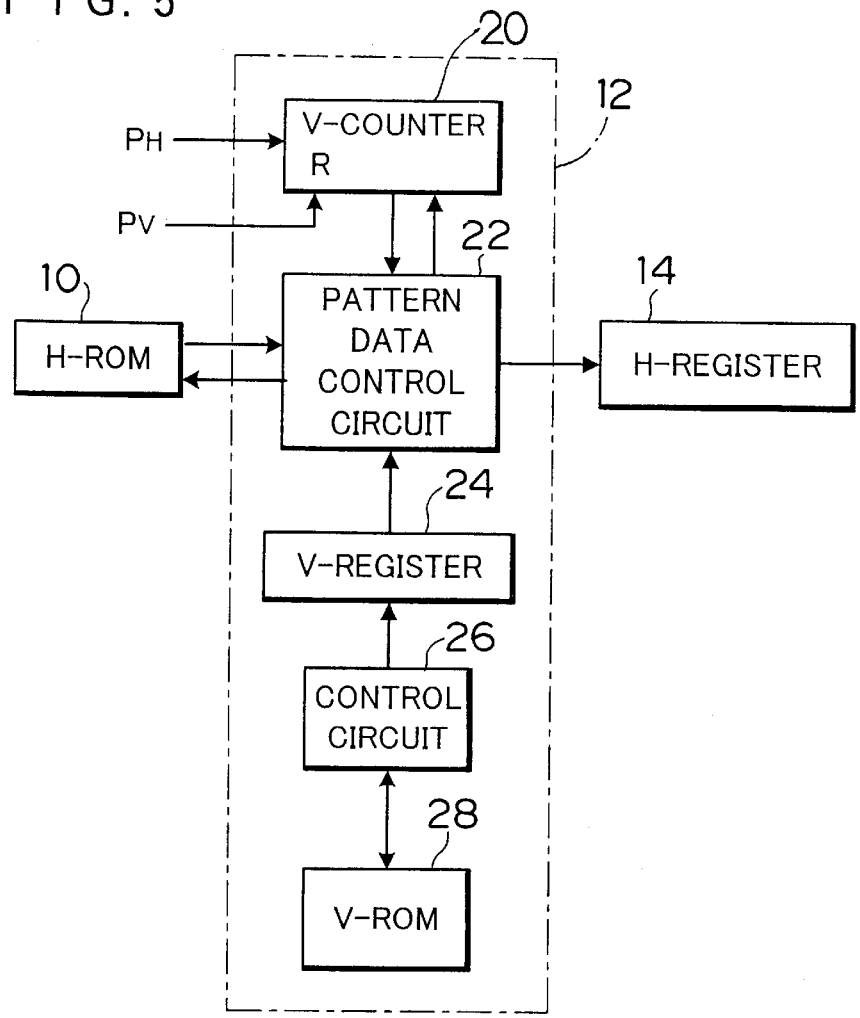
FIG. 5 is a block diagram showing a structure of the control circuit shown in FIG. 1.
FIG. 6 is a table showing mode data stored in a V-ROM shown in FIG. 5.

Hereunder the preferred embodiment of the present invention is explained in detail according to the accompanying drawings.

FIG. 1 is a block diagram showing the structure of a timing pulse generating apparatus according to an embodiment of the present invention. The timing pulse generating apparatus generates a variety of timing pulses for driving a solid-state imaging device (a three-phase charge-coupled device (CCD) in this embodiment). The timing pulse generating apparatus comprises a horizontal ROM (an H-ROM) 10, a control circuit 12, a horizontal register (an H-register) 14, a pattern generating circuit 16 and a horizontal counter (an H-counter) 18.

The H-ROM 10 stores pattern data for generating a plurality of timing pulses. The pattern data will now be explained. The case where three-phase timing pulses (three-phase vertical transmission clocks) V1, V2 and V3 for vertically transmitting electric charges accumulated in the three-phase CCD are generated will now be explained. In this case, the H-ROM 10 stores the pattern data including data of basic patterns a, b, c, . . . . FIG. 2 shows only the basic pattern α.

The basic patterns are data representing timing pulses for one period that are first generated in one horizontal scanning period (1H) and are composed of data representing start levels at the start of the 1H, positions of change points where signal levels first change from the start levels, positions of change points where the signal levels return to the start levels after passing the first change points, and pattern lengths that are lengths of one period of the timing pulses.

FIGS. 3(A), 3(B) and 3(C) are waveform diagrams showing the three-phase vertical transmission clocks V1, V2 and V3, respectively, in accordance with the basic pattern α shown in FIG. 2. The vertical transmission clock V1 in the basic pattern α is shown in FIGS. 2 and 3(A), wherein the start level of the vertical transmission clock V1 is set at "1", the horizontal position of the first change point where the signal level first changes from the start level is set at 5, the horizontal position of the second change point where the signal level returns to the start level is set at 25, and the pattern length is set at 40. The start levels, the horizontal positions of the first change points and the second change points of the vertical transmission clocks V2 and V3 in the basic pattern α are set in the same way as shown in FIGS. 2, 3(A) and 3(B).

The values set in the above-described way correspond to count values of the H-counter 18, which counts reference clocks from the start of the 1H. In the case of the three-phase vertical transmission clocks V1, V2 and V3, the pattern lengths are the same since the periods of the clocks are the same.

The pattern data stored in the H-ROM 10 are composed of data representing the names of the basic patterns and repeat times of the basic patterns in the 1H as shown in FIG. 4. Patterns are registered by different names when the repeat times are different even if the basic patterns are the same, as shown in FIG. 4.

The control circuit 12 in FIG. 1 reads the pattern data that corresponds to desired timing pulses from the H-ROM 10 and sets the pattern data in the H-register 14.

The count of the H-counter 18 is reset by pulses $P_H$, which synchronize with horizontal synchronous signals (HD), and the H-counter 18 counts the reference clocks CLK to output the count value to the pattern generating circuit 16 as data representing the horizontal position on one line. The pattern data set in the H-register 14 is inputted to the pattern generating circuit 16, which generates and outputs the timing pulses in accordance with the count value inputted from the H-counter 18 and the pattern data set in the H-register 14.

As shown in FIGS. 2, 3(A), 3(B) and 3(C), the pattern generating circuit 16 outputs timing pulses whose signal levels are the start levels while the count value is from 0 to the horizontal positions (the values representing the horizontal positions) of the first change points, outputs timing pulses whose signal levels are opposite from the start levels ("0" if the start level is "1", "1" if the start level is "0") while the count value is from the horizontal positions of the first change points to the horizontal positions of the second change points, and outputs timing pulses whose signal levels are the start levels while the count value is from the horizontal positions of the second change points to the end of the pattern length. The timing pulses for one period are generated in this way, first in the 1H.

Then, the timing pulses are repeatedly generated the number of times that the pattern data set in the H-register 14 represent. For example, the timing pulses for the N-th period in the 1H are generated in accordance with a count value arrived at by subtracting a value corresponding to a pattern length for N periods from the count value of the H-counter 18 and the values of the basic pattern or in accordance with values arrived at by adding a value corresponding to the pattern length for N periods to the values of the basic pattern and the count value of the H-counter 18. The timing pulses may be generated in accordance with the value of a counter that has the pattern length and the values of the basic pattern by counting with the counter for N periods.

If the pattern data set in the H-register 14 is not changed, the patterns of the timing pulses of the lines outputted from the pattern generating circuit 16 are the same.

The control circuit 12 in FIG. 1 will now be explained. FIG. 5 is a block diagram showing a structure of the control circuit 12. As shown in FIG. 5, the control circuit 12 comprises a vertical counter (a V-counter) 20, a pattern data control circuit 22, a vertical register (a V-register) 24, a control circuit 26 and a vertical ROM (a V-ROM) 28.

The count of the V-counter 20 is reset by pulses $P_V$ which synchronize with vertical synchronous signals (VD), and the V-counter 20 counts the pulses $P_H$, which synchronize with the horizontal synchronous signals (HD), and outputs the count value to the pattern data control circuit 22 as data representing a vertical position of one line.

A plurality of pieces of mode data are stored in the V-ROM 28 in accordance with a plurality of drive modes of the solid-state imaging device. As shown in FIG. 6, the mode data are composed of data representing the names of the patterns arranged to output one or more types of timing pulses in a predetermined order in one field or frame and vertical switch positions where the patterns are switched. FIG. 6 shows the mode data of a mode A. In the mode A, the timing pulses are switched in the order of patterns A, B, C and D, and the patterns are switched from the pattern A to the pattern B at the first line, from the pattern B to the pattern C at the third line, and from the pattern C to the pattern D at the fifth line. The timing pulses of the pattern D are outputted until the last line of one field.

The control circuit 26 reads the desired mode data from the V-ROM 28 and sets the read mode data in the V-register 24. The mode data set in the V-register 24 is inputted to the pattern data control circuit 22, and the count value representing the position of the line is also inputted from the V-counter 20 to the pattern data control circuit 22. The pattern data control circuit 22 reads the pattern data from the H-ROM 10 in accordance with the count value inputted from the V-counter 20 and the mode data set in the V-register 24, and sets the read pattern data in the H-register 14.

Figure 7:
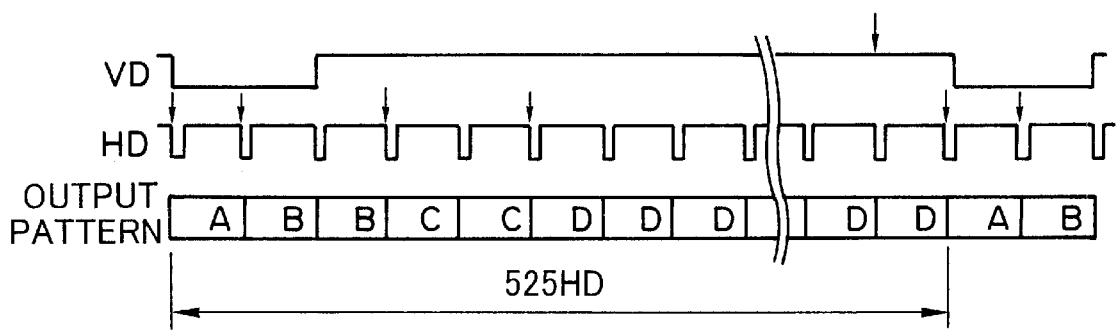
FIG. 7 is a diagram showing an output pattern of the timing pulses corresponding to the mode data shown in FIG. 6.

In the case where the mode data in FIG. 6 is set in the V-register 24, the pattern data control circuit 22 reads the pattern data of the pattern A from the H-ROM 10 and sets the read pattern data in the H-register 14 when the count value of the V-counter 20 is 0, as shown in FIGS. 6 and 7. Likewise, the pattern data control circuit 22 sets the pattern data of the pattern B in the H-register 14 when the count value of the V-counter 20 is 1, sets the pattern data of the pattern C in the H-register 14 when the count value of the V-counter 20 is 3 and sets the pattern data of the pattern D in the H-register 14 when the count value of the V-counter 20 is 5.

The pattern data are thus switched to be set in the H-register 14, and the pattern generating circuit 16 generates the timing pulses, which are switched in accordance with the vertical positions in one field.

Figure 8:
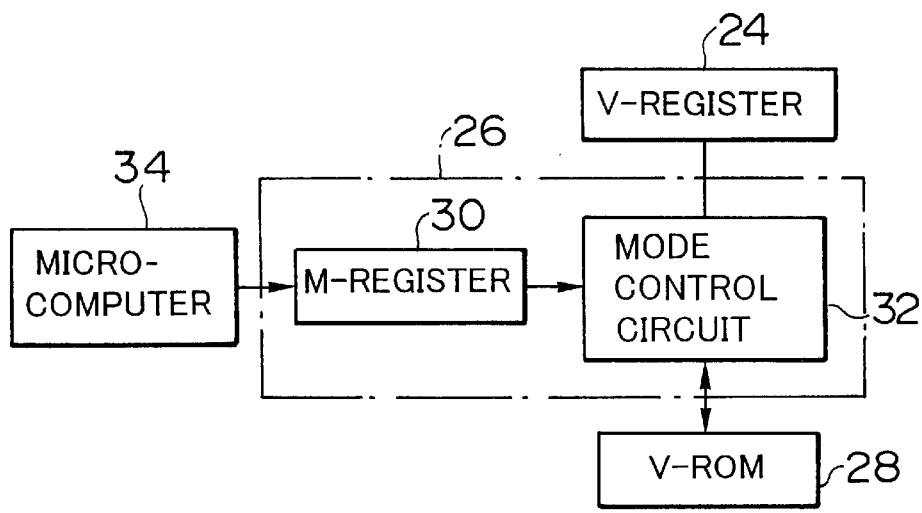
FIG. 8 is a block diagram showing a structure of a control circuit shown in FIG. 5.

The control circuit 26 in FIG. 5 will now be explained. FIG. 8 is a block diagram showing a structure of the control circuit 26. As shown in FIG. 8, the control circuit 26 comprises a mode register (an M-register) 30 and a mode control circuit 32.

An appropriate mode name is set in the M-register 30 by a serial communication from a microcomputer 34, or the like. The mode control circuit 32 reads the mode data corresponding to the mode name set in the M-register 30 from the V-ROM 28 at each vertical synchronous period (1V) and sets the read mode data in the V-register 24. Hence, the mode data of the mode A is set in the V-register 24 if a drive mode 1 of the solid-state imaging device is only the mode A, and the mode data of the mode A and the mode data of the mode B are alternately set in the V-register 24 at each 1V if a drive mode 2 of the solid-state imaging device is alternately switched to the mode A and the mode B at each 1V Therefore, by storing the mode data at each 1V in the V-ROM 28, the timing pulse generating apparatus can be adapted to drive modes where the mode data are switched at each 1V.

Figure 9:
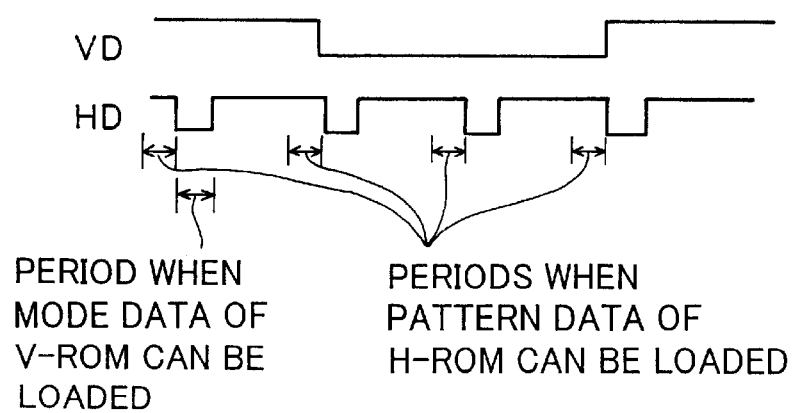
FIG. 9 is a diagram showing periods when pattern data and the mode data can be loaded into registers.

As shown in FIG. 9, the pattern data of the H-ROM 10 is loaded into the H-register 14 during the period just before the horizontal synchronous signal HD is outputted, and the mode data of the V-ROM 28 is loaded into the V-register 24 while the horizontal synchronous signal HD is outputted 1H before the vertical synchronous signal VD is outputted. Thus, the data can be loaded into the registers without changing (without obstructing) the waveforms of the signals that are being outputted. The waveforms are outputted by a process such as freezing while the data are loaded into the registers. If buffers are provided before the registers and the next pattern data are stored in the buffers and the pattern data is loaded when the horizontal synchronous signal HD falls, the waveforms do not have to be frozen.

In the case where the timing pulse generating apparatus according to the present invention is composed of an integrated circuit (an IC), the IC can not be adapt a variety of solid-state imaging devices when the pattern data and the like are stored in the ROM. Then, a rewritable storing device such as a static random access memory (SRAM) or an external accessible device may be incorporated in the IC in stead of the ROM, and the pattern data may be stored in the same ROM as a microcomputer program and loaded into the SRAM. In this case, desired timing pulses can be generated for various purposes, and no other ROM has to be provided.

In the present embodiment, the CCD is driven, but the present invention can be applied to a CMOS sensor.

As explained above, according to the timing pulse generating apparatus according to the present invention, the amount of the data used for generating the timing pulses can be remarkably reduced, and thus the cost of the storing device for storing the data can be reduced.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A timing pulse generating apparatus which generates a variety of timing pulses used for acquiring image signals from a solid-state imaging device, the timing pulse generating apparatus comprising:
    a horizontal counter which counts reference clocks, a count value of the horizontal counter being reset in synchronization with a horizontal synchronous signal;
    a storing device which stores pattern data for generating the timing pulses, the pattern data comprising data representing timing pulses for one period first generated in a horizontal scanning period and repeat times of the timing pulses for one period in the horizontal scanning period;
    a pattern data setting device which reads the pattern data corresponding to desired timing pulses from the storing device and sets the read pattern data in a horizontal register; and
    a timing pulse generating device which generates and outputs the timing pulses in accordance with the count value of the horizontal counter and the pattern data set in the horizontal register.

2. The timing pulse generating apparatus as set forth in claim 1, wherein the data representing the timing pulses for one period first generated in the horizontal scanning period comprise data representing a start level at a start of the horizontal scanning period, a position of a first change point where a signal level first changes from the start level, a position of a second change point where the signal level returns to the start level after passing the first change points, and a pattern length which is a length of one period of the timing pulses.

3. The timing pulse generating apparatus as set forth in claim 2, wherein the timing pulse generating device generates the timing pulses for one period by setting a signal level to the start level at the start of the horizontal scanning period, then reversing the signal level from the start level when the count value of the horizontal counter reaches the first change point represented with the pattern data, then setting the signal level to the start level when the count value of the horizontal counter reaches the second change point represented with the pattern data, and then maintaining the signal level until the count value of the horizontal counter reaches the pattern length, and the timing pulse generating device generates the timing pulses for one period the repeat times represented with the pattern data.

4. A timing pulse generating apparatus which generates a variety of timing pulses used for acquiring image signals from a solid-state imaging device in accordance with pattern data representing timing pulses set in a horizontal register, the timing pulse generating apparatus comprising:
    a vertical counter which counts clocks synchronous with a horizontal synchronous signal, a count value of the vertical counter being reset in synchronization with a vertical synchronous signal;
    a first storing device which stores a plurality of pieces of pattern data for generating a plurality of types of timing pulses;
    a second storing device which stores mode data in accordance with a plurality of drive modes of the solid-state imaging device, the mode data representing names of patterns in the pattern data arranged in a predetermined order in one of one field and one frame to output at least one type of timing pulses and vertical switch positions where the timing pulses corresponding to the names of the patterns are switched;
    a mode data setting device which reads the mode data from the second storing device in accordance with the drive mode of the solid-state imaging device and sets the read mode data in a vertical register; and
    a pattern data setting device which reads the pattern data from the first storing device in accordance with the count value of the vertical counter and the mode data set in the vertical register and sets the pattern data in the horizontal register.

5. The timing pulse generating apparatus as set forth in claim 4, wherein the mode data setting device comprises:
    a mode name setting device which sets a name of a mode in a mode register in accordance with a drive mode of the solid-state imaging device at each vertical synchronous period; and
    a mode data reading device which reads the mode data from the second storing device in accordance with the name of the mode set in the mode register.

6. The timing pulse generating apparatus as set forth in claim 4, wherein the pattern data setting device sets, at the start of one vertical scanning, the pattern data corresponding to a name of a first pattern in the mode data set in the vertical register, and performs, in the order of the names of the patterns in the mode data, setting the pattern data corresponding to the name of the next pattern in the mode data set in the vertical register when the count value of the vertical counter reaches the next vertical switch position.

7. The timing pulse generating apparatus as set forth in claim 6, wherein the mode data setting device comprises:
   a mode name setting device which sets a name of a mode in a mode register in accordance with a drive mode of the solid-state imaging device at each vertical synchronous period; and
   a mode data reading device which reads the mode data from the second storing device in accordance with the name of the mode set in the mode register.

8. A timing pulse generating apparatus which generates a variety of timing pulses used for acquiring image signals from a solid-state imaging device, the timing pulse generating apparatus comprising:
   a horizontal counter which counts reference clocks, a count value of the horizontal counter being reset in synchronization with a horizontal synchronous signal;
   a first storing device which stores pattern data for generating the timing pulses, the pattern data comprising data representing timing pulses for one period first generated in a horizontal scanning period and repeat times of the timing pulses for one period in the horizontal scanning period;
   a vertical counter which counts clocks synchronous with a horizontal synchronous signal, a count value of the vertical counter being reset in synchronization with a vertical synchronous signal;
   a second storing device which stores mode data in accordance with a plurality of drive modes of the solid-state imaging device, the mode data representing names of patterns in the pattern data arranged in a predetermined order in one of one field and one frame to output at least one type of timing pulses and vertical switch positions where the timing pulses corresponding to the names of the patterns are switched;
   a mode data setting device which reads the mode data from the second storing device in accordance with the drive mode of the solid-state imaging device and sets the read mode data in a vertical register;
   a pattern data setting device which reads the pattern data from the first storing device in accordance with the count value of the vertical counter and the mode data set in the vertical register and sets the pattern data in the horizontal register; and
   a timing pulse generating device which generates and outputs the timing pulses in accordance with the count value of the horizontal counter and the pattern data set in the horizontal register.

9. The timing pulse generating apparatus as set forth in claim 8, wherein the mode data setting device comprises:
   a mode name setting device which sets a name of a mode in a mode register in accordance with a drive mode of the solid-state imaging device at each vertical synchronous period; and
   a mode data reading device which reads the mode data from the second storing device in accordance with the name of the mode set in the mode register.

10. The timing pulse generating apparatus as set forth in claim 8, wherein the data representing the timing pulses for one period first generated in the horizontal scanning period comprise data representing a start level at a start of the horizontal scanning period, a position of a first change point where a signal level first changes from the start level, a position of a second change point where the signal level returns to the start level after passing the first change points, and a pattern length which is a length of one period of the timing pulses.

11. The timing pulse generating apparatus as set forth in claim 10, wherein the timing pulse generating device generates the timing pulses for one period by setting a signal level to the start level at the start of the horizontal scanning period, then reversing the signal level from the start level when the count value of the horizontal counter reaches the first change point represented with the pattern data, then setting the signal level to the start level when the count value of the horizontal counter reaches the second change point represented with the pattern data, and then maintaining the signal level until the count value of the horizontal counter reaches the pattern length, and the timing pulse generating device generates the timing pulses for one period the repeat times represented with the pattern data.

12. The timing pulse generating apparatus as set forth in claim 8, wherein the pattern data setting device sets, at the start of one vertical scanning, the pattern data corresponding to a name of a first pattern in the mode data set in the vertical register, and performs, in the order of the names of the patterns in the mode data, setting the pattern data corresponding to the name of the next pattern in the mode data set in the vertical register when the count value of the vertical counter reaches the next vertical switch position.

13. The timing pulse generating apparatus as set forth in claim 12, wherein the mode data setting device comprises:
   a mode name setting device which sets a name of a mode in a mode register in accordance with a drive mode of the solid-state imaging device at each vertical synchronous period; and
   a mode data reading device which reads the mode data from the second storing device in accordance with the name of the mode set in the mode register.

* * * * *